Patented Feb. 22, 1949

2,462,210

UNITED STATES PATENT OFFICE 2,462,210

STARCH ESTERS

Owen A. Moe, Minneapolis, Minn., assignor to General Mills, Inc., a corporation of Delaware No Drawing. Application May 30, 1945,
Serial No. 596,813

3 Claims. (Cl. 260—234)

The present invention relates to the preparation of fatty acid esters of starch.

Starch esters have been reported in the literature on various occasions but the processes described for their preparation have been tedious and expensive and have often resulted in low yields. Typical of these attempts is the process shown in British Patent No. 535,949 wherein a starch is preliminarily gelatinized by means of formic acid and the gelatinized starch then treated with an esterifying agent. Such processes have not been practical for various reasons including the fact that they require practically anhydrous formic acid and the fact that formic acid used in the process is not recoverable.

It has been discovered that it is possible to prepare starch esters in a simple and economical manner by forming a partial formic acid ester of the starch before carrying on any further esterification with other fatty acids. It has also been discovered that it is possible to do the preliminary formic acid esterification with formic acid compositions containing appreciable quantities of water such as formic acid compositions available commercially. It has also been discovered that the aqueous formic acid employed may be recovered for re-use.

It is the primary object of the present invention to provide a simple and economical process for the preparation of starch esters. It is another object of the present invention to provide a process of preliminarily esterifying the starch with formic acid and of recovering any excess formic acid used. It is a further object of the invention to provide a process for the preparation of starch formate by means of aqueous formic acid.

These and other objects of the present invention will be more readily apparent from the following description of the invention with particular reference to examples which are to be understood as illustrative only and not as limiting the invention. In general, the invention involves the preliminary esterification of starch with formic acid containing appreciable quantities of water, followed by the precipitation of the starch formate, the recovery of excess formic acid, and the subsequent esterification of the isolated starch formate. It has been discovered that by the introduction of a small formyl content into the starch molecule the starch becomes exceedingly reactive and can be further esterified by introduction of other fatty acid radicles and especially fatty acid radicles in excess of two carbon atoms.

In the preparation of the starch formate it has been found possible to use aqueous formic acid containing appreciable quantities of water, as for example, formic acid of 40% to 85% concentration and preferably between 50% and 77.5%, the latter concentration being the composition of an azeotropic mixture. The employment of formic acid of concentrations within this range has been found desirable for various reasons. In the first place, such aqueous formic acid mixtures are available commercially at low prices. Secondly, the employment of such low concentration mixtures permits uniform distribution of the formic acid and the starch before gelatinization of the starch occurs. Uniform gelatinization of the starch is important in that the formylation of the starch will be uniform only as gelatinization has been uniform.

The mixture of starch and aqueous formic acid is allowed to stand for an extended period of time, for example, twenty hours in order for the starch to become appreciably esterified with formic acid. The starch formate may then be precipitated from the solution in any suitable manner as for example, by the addition of a water miscible organic solvent in which the starch formate is not soluble such as ketones, more particularly acetone, methyl ethyl ketone, and the like. The precipitated starch formate may then be removed and dried. The mother liquor may be treated for the recovery of acetone and formic acid by subjecting it to fractional distillation which results in a simple recovery of both the acetone and formic acid. It is advantageous in this regard to employ a formic acid composition somewhat near that of the azeotrope as in that way formic acid of the proper concentration for subsequent use may be recovered directly.

The extent of formylation is preferably maintained within 5% to 20%. If the formyl content is lowered appreciably below 5% the reactivity of the formate becomes quite low, necessitating longer reaction periods and more drastic reaction conditions for subsequent esterification. Formyl contents substantially in excess of 20% tend to increase the cost without appreciably increasing the reactivity of the formate.

Subsequent esterification of the starch formate may be accomplished by simply mixing the starch formate with a mixture of an organic acid and an organic anhydride containing a small amount of catalyst. Sulfuric acid, phosphoric acid, and a mixed sulfuric acid-phosphoric acid catalyst has been found to possess distinctive advantages. The reaction mixture may be heated to a moderate temperature; for example 85°–95° C. for a short period of time (5 to 10 minutes) after which time the starch appears to be nearly completely esterified. The reaction mixture may then be cooled and poured into ether or water to precipitate the product. Products of total acyl content—up to 50% and higher—may be obtained by this method.

It has also been observed that esterification of the starch formate can be accomplished in an organic solvent such as dioxane by merely adding the desired organic anhydride containing a small amount of catalyst. As an alternative it is also possible to disperse the starch formate in a desired acid and introduce ketene to obtain further esterification.

The above methods are of particular advantage in the preparation of starch propionates, butyrates, and esters of other fatty acids of higher molecular weight. Other methods of preparing starch esters do not appear to be commercially feasible for the preparation of these higher esters.

The products obtained display good solubility in acetone and other known solvents. These solutions, particularly of esters higher than the acetate, when plasticized with a suitable plasticizing agent such as dibutyl phthalate, yield good films when cast on glass plates. The films so produced are remarkably clear and very flexible and far superior to the starch acetate films. Moreover, solutions of the higher esters display very good viscosities.

Example 1

20 parts of wheat starch were mixed with 20 parts of 65% formic acid. The starch was easily dispersed in the reaction mixture before gelatinization of the starch occurred at room temperature. This gelatinized formic acid mixture was permitted to stand at room temperature for approximately twenty hours. The resulting starch formate was precipitated by the addition of acetone until precipitation was complete. The precipitated product was collected by filtration and was dried. The formyl content of the starch formate prepared as above is approximately 9.5%. It is apparent that the formyl content will decrease with a decrease in the concentration of the formic acid employed. These starch formates thus prepared are of low formyl content and are surprisingly reactive towards organic acids and anhydrides. The formic acid and acetone from the filtrate referred to above can be recovered by subjecting the filtrate to fractional distillation. The acetone and the formic acid are very readily recovered, thus making the process very inexpensive while at the same time producing a reactive starch intermediate to be used for further esterification.

15 parts of the above starch formate were mixed with 85 parts of acetic acid and 85 parts of acetic anhydride, and one drop of concentrated sulfuric acid was added with stirring. The reaction mixture was heated to the reflux temperature and after four minutes only a few scattered particles remained unesterified. The refluxing was continued for another minute and a clear homogeneous solution resulted. The reaction mixture was cooled and poured into 1500 parts of cold water with stirring and this mixture was permitted to stand overnight. The product was then collected by filtration and dried in a known manner.

Example 2

10 parts of a starch formate having a formyl content of 8.5% to 9% (prepared from 57.6% formic acid in accordance with Example 1) were mixed with 75 parts of acetic acid and 75 parts of acetic anhydride while stirring. Sulfuric acid in the amount of 0.0334 part in two parts of acetic acid was added with stirring. The reaction flask was placed in an oil bath maintained at 85° C. After six minutes the temperature of the reaction mixture had reached 95° C. and the starch appeared to be nearly completely esterified. The reaction mixture was cooled in a cold water bath and after cooling was poured into ether or water to precipitate the product, which was then collected by filtration and dried. Analysis showed total acyl calculated as acetyl was 45.6%. Of this, approximately 5% was formyl.

Example 3

15 parts of a starch formate having a formyl content of about 11.5% (prepared from 72.5% formic acid in accordance with Example 1) were mixed with 75 parts of propionic acid and 75 parts of propionic anhydride. Catalysts composed of 0.4 part phosphoric acid and 0.026 part of sulfuric acid were added with stirring. The resulting reaction mixture was heated to 125° C. with stirring and maintained at this temperature for a period of three minutes at which time a substantially clear solution was formed. The product was worked up as in Example 2 and on analysis showed a propionyl content of about 48.5% and a formyl content of about 2.5%. This product displayed good solubility in acetone, ethylene dichloride, and other solvents. The solution thus obtained showed good viscosity and excellent films were prepared from these solutions when plasticized. The plasticized films were remarkably clear and very flexible.

Example 4

27 parts starch formate of about 17.5% formyl (prepared from 85% formic acid as in Example 1) were mixed with 140 parts of butyric acid and 140 parts of butyric anhydride. One drop of sulfuric acid was added as catalyst. The resulting reaction mixture was heated with stirring until the reflux temperature was reached. This temperature was maintained for a period of eight minutes at which time a substantially clear and very viscous solution resulted. The cooled reaction mixture was poured into a petroleum ether solvent commercially sold under the name "Skellysolve B." The precipitated product was collected by filtration and was dried. Solubility and film characteristics of this product were comparable to those of the product of Example 3. The product yielded a very viscous 3% solution in ethylene dichloride.

Example 5

15 parts of a starch formate of about 8.5% to 9.0% formyl content (prepared from 57.6% formic acid as in Example 1) were mixed with 75 parts of acetic acid and 75 parts of propionic anhydride, then 0.02 part of sulfuric acid and 0.4 part of phosphoric acid were added. The above reaction mixture was heated with stirring to 125° C. for 5 minutes when a substantially clear solution resulted. After an additional 15 minutes, the reaction temperature was 110° C. This reaction mixture was poured into a liter of water and the product was collected by filtration and dried. This product displayed excellent solubility in the usual solvent and yielded a film of remarkable clarity. It should be noted that instead of using acetic acid and propionic anhydride this same reaction can be carried out using propionic acid and acetic anhydride.

*Example 6*

15 parts of a starch formate having formyl content of 8.5% to 9.0% (prepared from 57.6% formic acid as in Example 1) were mixed with 80 parts of acetic anhydride and 60 parts of butyric acid; sulfuric acid in the amount of 0.025 part was added as catalyst. The resulting reaction mixture was heated at 103° to 107° C. for a period of six minutes at which time it appeared that the reaction was substantially complete. The cooled reaction mixture was poured into "Skellysolve B," and the precipitated product was collected and dried. Products of this type showed good solubility and film formation. In this example it is also possible to substitute a mixture of butyric anhydride and acetic acid.

If it is desired to produce a mixed starch ether containing predominantly the organic acid radicles of three and four carbon atoms this may be accomplished by using either a mixture of propionic acid and butyric anhydride or a mixture of propionic anhydride and butyric acid.

This reaction is applicable to starches in general and has been found particularly adaptable to wheat, corn, mandioca, and modified wheat starches. A wide variety of catalysts may be employed with a varying degree of success. Acidic catalysts such as sulfuric acid, phosphoric acid, mixtures of sulfuric and phosphoric acids, perchloric acid, and salts such as zinc chloride may be used. Boron trifluoride has also been found satisfactory. Phosphoric acid appeared to produce products displaying very good viscosity in solutions. It is preferred, however, for the rapid preparation of a product displaying good solubility and viscosity to employ a mixture of sulfuric and phosphoric acids. The exact composition of the catalysts may be varied somewhat depending on the nature of the product desired. The ratio of the amount of starch to the amount of esterifying agent may be varied quite widely. Likewise, time and temperature may be varied over a wide range but it is preferred to employ moderate temperatures as the reaction period is very short and the products obtained in this manner are of excellent quality.

While various specific embodiments of the invention have been described it is to be understood that the invention is not limited thereto but may be varied within the scope of the following claims.

I claim as my invention:

1. Process of preparing starch esters which comprises contacting starch with aqueous formic acid containing from 40% to 85% formic acid to produce a starch formate having a formyl content of from 5% to 20%, precipitating and separating the starch formate from the reaction mixture, and esterifying the starch formate with an organic acylating agent in which the acyl group has at least three carbon atoms.

2. Process of preparing starch esters which comprises contacting starch with aqueous formic acid containing from 40% to 85% formic acid to produce a starch formate having a formyl content of from 5% to 20%, adding acetone to the reaction mixture to precipitate the starch formate, separating the precipitated starch formate from the reaction mixture, and esterifying the starch formate further with an organic acylating agent in which the acyl group has at least three carbon atoms.

3. Process of preparing starch formate which comprises reacting starch with aqueous formic acid containing approximately 77.5% formic acid to produce a starch formate having a formyl content of from 5-20%, adding an aliphatic ketone to the reaction mixture to precipitate the starch formate, removing the starch formate from the liquid phase and fractionally distilling the liquid phase to recover the aliphatic ketone and the excess formic acid, the latter as an azeotrope containing approximately 77.5% formic acid, and further esterifying the starch formate with an organic acylating agent in which the acyl group has at least three carbon atoms.

OWEN A. MOE.

REFERENCES CITED

The following references are of record in the file of this patent:

UNITED STATES PATENTS

| Number | Name | Date |
| --- | --- | --- |
| 778,173 | Cross et al. | Dec. 20, 1904 |
| 1,685,220 | Middleton | Sept. 25, 1928 |
| 1,722,914 | Heimann et al. | July 30, 1929 |
| 326,497 | Groen, A. P. C. Spec. | Apr. 20, 1943 |
| 2,376,378 | Murray | May 22, 1945 |

FOREIGN PATENTS

| Number | Country | Date |
| --- | --- | --- |
| 356,665 | Great Britain | Sept. 10, 1931 |
| 487,020 | Great Britain | June 14, 1938 |